United States Patent
Kouznetsov et al.

(10) Patent No.: US 6,622,150 B1
(45) Date of Patent: Sep. 16, 2003

(54) SYSTEM AND METHOD FOR EFFICIENTLY MANAGING COMPUTER VIRUS DEFINITIONS USING A STRUCTURED VIRUS DATABASE

(75) Inventors: Victor Kouznetsov, Aloha, OR (US); Andrei Ushakov, Hillsboro, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 304 days.

(21) Appl. No.: 09/740,294

(22) Filed: Dec. 18, 2000

(51) Int. Cl.[7] .............................................. G06F 17/30
(52) U.S. Cl. ..................................................... 707/200
(58) Field of Search ................................ 707/104.1, 10, 707/102, 100, 200, 500; 713/188, 200, 201, 187, 176; 714/38, 28, 54

(56) References Cited

U.S. PATENT DOCUMENTS

| | | | | |
|---|---|---|---|---|
| 5,960,170 A | * | 9/1999 | Chen et al. .................... | 714/38 |
| 6,279,113 B1 | * | 8/2001 | Vaidya ......................... | 713/201 |
| 6,314,425 B1 | * | 11/2001 | Serbinis et al. ............... | 707/10 |
| 6,338,141 B1 | * | 1/2002 | Wells .......................... | 713/200 |
| 6,357,008 B1 | * | 3/2002 | Nachenberg .................. | 714/38 |
| 6,397,335 B1 | * | 5/2002 | Franczek et al. ........... | 713/188 |

FOREIGN PATENT DOCUMENTS

WO PCT/EP01/09643 * 3/2002 ............. G06F/1/00

OTHER PUBLICATIONS

Damaris Christensen Titled "Beyond Viral Vaccination" Science news online www.sciencenews.org/sn_arc99/7_31_99/bob2.htm Jul. 31, 1999 pp. 1–4.*

Company News "Kaspersky Lab: What it is and what it will be" Dec. 28, 2000 www.viruslist.com.*

* cited by examiner

*Primary Examiner*—Diane D. Mizrahi
(74) *Attorney, Agent, or Firm*—Patrick J. S. Inouye; Christopher J. Hamaty

(57) ABSTRACT

A system and method for efficiently managing computer virus definitions using a structured virus database are described. One or more virus definition records are stored in a structured virus database. Each virus definition record includes an identifier uniquely identifying a computer virus, at least one virus name associated with the computer virus, a virus definition sentence including object code providing operations to detect the identified computer virus within a computer system, and a virus removal sentence including object code providing operations to clean the identified computer virus from the computer system. The virus definition records in the structured virus database are accessed indexed by the identifier and the at least one virus name for each virus definition record. The object code of the virus definition sentence and the virus removal sentence for each accessed virus definition record is interpreted.

20 Claims, 8 Drawing Sheets

SYSTEM AND METHOD FOR EFFICIENTLY MANAGING COMPUTER VIRUS DEFINITIONS USING A STRUCTURED VIRUS DATABASE

FIELD OF THE INVENTION

The present invention relates in general to computer anti-virus detection and distribution and, in particular, to system and method for efficiently managing computer virus definitions using a structured virus database.

BACKGROUND OF THE INVENTION

Computer viruses are program code usually causing malicious and often destructive results. All computer viruses are self-replicating. More precisely, computer viruses include any form of self-replicating computer code which can be stored, disseminated, and directly or indirectly executed. Computer viruses can be disguised as application programs, functions, macros, electronic mail attachments, and even applets and in hypertext links.

Computer viruses travel between machines via infected media or over network connections disguised as legitimate files or messages. The earliest computer viruses infected boot sectors and files. Over time, computer viruses evolved into numerous forms and types, including cavity, cluster, companion, direct action, encrypting, multipartite, mutating, polymorphic, overwriting, self-garbling, and stealth viruses, such as described in "McAfee.com: Virus Glossary of Terms," Networks Associates Technology, Inc., (2000), the disclosure of which is incorporated by reference. Most recently, macro viruses have become increasingly popular. These viruses are written in macro programming languages and are attached to document templates or as electronic mail attachments.

Historically, anti-virus solutions have reflected the sophistication of the viruses being combated. The first anti-virus solutions were stand-alone programs for identifying and disabling viruses. Eventually, anti-virus solutions grew to include specialized functions and parameterized variables that could be stored in a data file. During operation, the data file was read by an anti-virus engine operating on a client computer. Finally, the specialized functions evolved into full-fledged anti-virus languages for defining virus scanning and cleaning, including removal and disablement, instructions.

Presently, most anti-virus companies store the anti-virus language code for each virus definition into data files. For efficiency, the source code is compiled into object code at the vendor site. The virus definitions, including the object code, are then stored into the data files. To speed virus detection, the virus definitions are organized for efficient retrieval often as unstructured binary data.

Anti-virus companies are continually discovering new computer viruses on a daily basis and must periodically distribute anti-virus software updates. Each update augments the data file with new computer virus definitions, as well as replacing or deleting old virus definitions. Over time, however, the size of the data files tend to become large and can take excessive amounts of time to download. Long download times are particularly problematic on low bandwidth connections or in corporate computing environments having a large user base.

Consequently, one prior art approach to decreasing anti-virus data file downloading times determines and transfers only the changes between old and new data files. The anti-virus company first compares old and new data files and forms a binary delta file. The delta file is downloaded by users and a patching utility program converts the old data file into the new data file by replacing parts of the binary data file. While this approach can often decrease the amount of data to be downloaded, the sizes of the delta files are arbitrary and vary greatly, depending upon the differences in binary data. In the worst case, the old and new data files are completely different and the delta file effectively replicates the new data file, thereby saving no download time.

Therefore, there is a need for an approach to managing virus definitions in structured fashion for allowing efficient updating. Preferably, such an approach would store virus definitions maintained as indexed records in a database management system. Such an approach would allow efficient virus definition record addition, replacement, and deletion with minimal and controllable download times.

SUMMARY OF THE INVENTION

The present invention provides a system and method for storing, distributing, and accessing computer virus definition data using a structured virus database. On a client, a structured virus database is maintained for storing virus definition records. Each record has a unique identifier, one or more virus names, and object code "sentences" defining operations for detecting the presence of and for removing a compute virus. The operations are executed by an anti-virus engine to effect computer anti-virus protection. Periodically, updated master structured virus databases are retrieved. Preferably, the retrieved databases only contain the new or changed virus records. Each of the records is processed to add, delete, or replace records in the database.

An embodiment of the present invention is a system and method for efficiently managing computer virus definitions using a structured virus database. One or more virus definition records are stored in a structured virus database. Each virus definition record includes an identifier uniquely identifying a computer virus, at least one virus name associated with the computer virus, a virus definition sentence including object code providing operations to detect the identified computer virus within a computer system, and a virus removal sentence including object code providing operations to clean the identified computer virus from the computer system. The virus definition records in the structured virus database are accessed indexed by the identifier and the at least one virus name for each virus definition record. The object code of the virus definition sentence and the virus removal sentence for each accessed virus definition record is interpreted.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
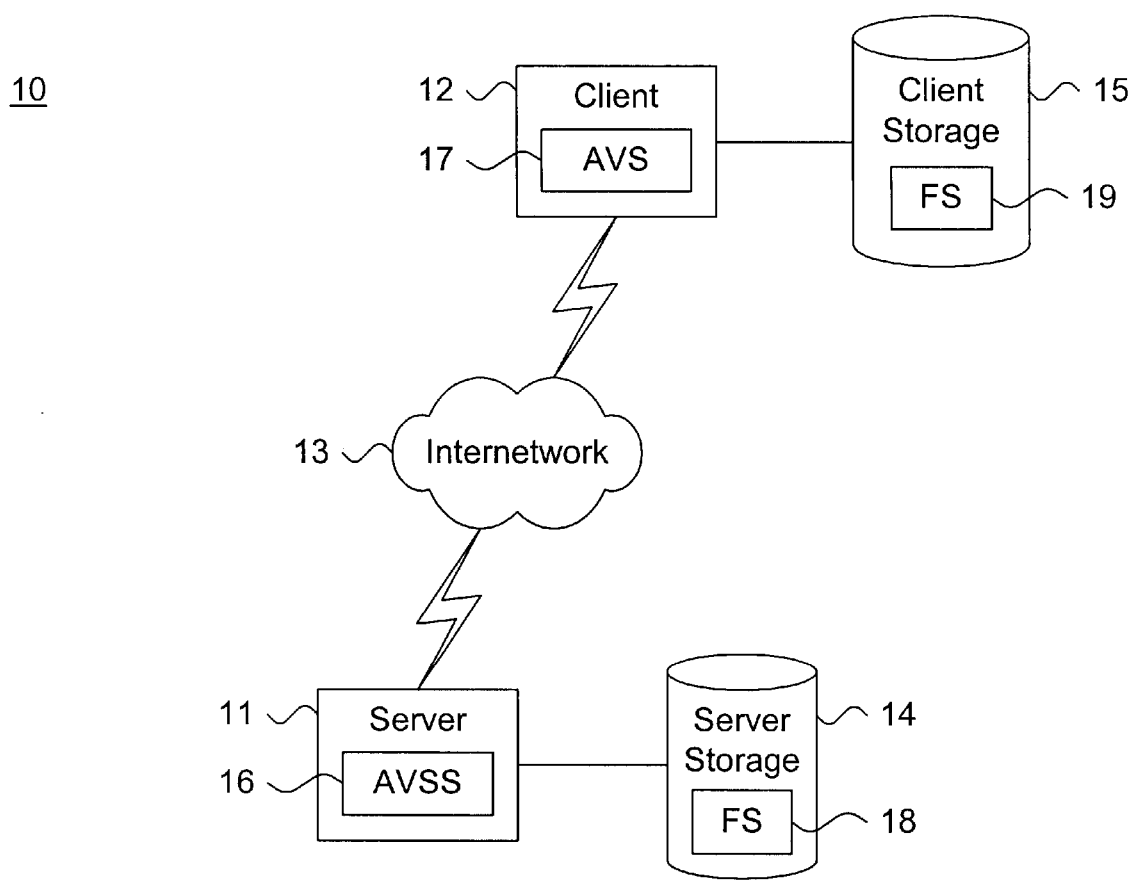
FIG. 1 is a block diagram showing a networked computing environment, including a system for efficiently managing computer virus definitions using a structured virus database, in accordance with the present invention.

FIG. 1 is a block diagram showing a networked computing environment 10, including a system for efficiently managing computer virus definitions using a structured virus database, in accordance with the present invention. The networked computing environment 10 includes a server 11 interconnected to a client 12 via an internetwork 13. The server 11 provides client services, such as information retrieval and file serving. Alternatively, the interconnection could be with a direct connection, over a dialup connection, via an intranetwork, or by a combination of the foregoing or with various other network configurations and topologies, as would be recognized by one skilled in the art.

The server 11 includes a persistent store kept on a file system 18 maintained on a server storage device 14. Individual directories, files, and databases are stored in the file system 18. Suitable persistent storage devices include randomly accessible devices, such as hard drives and rewriteable media, although other forms of persistent storage devices could also be used by or incorporated into the server 11. Similarly, the client 12 also includes a persistent store kept on a file system 19 maintained on a client storage device 15.

The client 12 can potentially be exposed to computer viruses by virtue of having interconnectivity with outside machines. As protection, the client 12 includes an anti-virus system 17 (AVS) that executes operations to scan for the presence of and to clean off any computer viruses. An exemplary anti-virus system 17 is the VirusScan product, licensed by Networks Associates Technology, Inc., Santa Clara, Calif. As further described below beginning with reference to FIG. 2, the anti-virus system 17 reads in virus definitions from external virus definition files and utilizes the virus definitions in performing virus scanning and cleaning.

The external virus definition files must be periodically updated with new computer virus definitions to enable the anti-virus system 17 to continue to provide up-to-date anti-virus protection. Thus, the server 11 includes an anti-virus support system 16 (AVSS) that executes an updating service. The client 12 can connect to the server 11 and download updated external virus definition files from the anti-virus support system 16 for subsequent incorporation into a structured virus database.

The individual computer systems, including server 11 and client 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
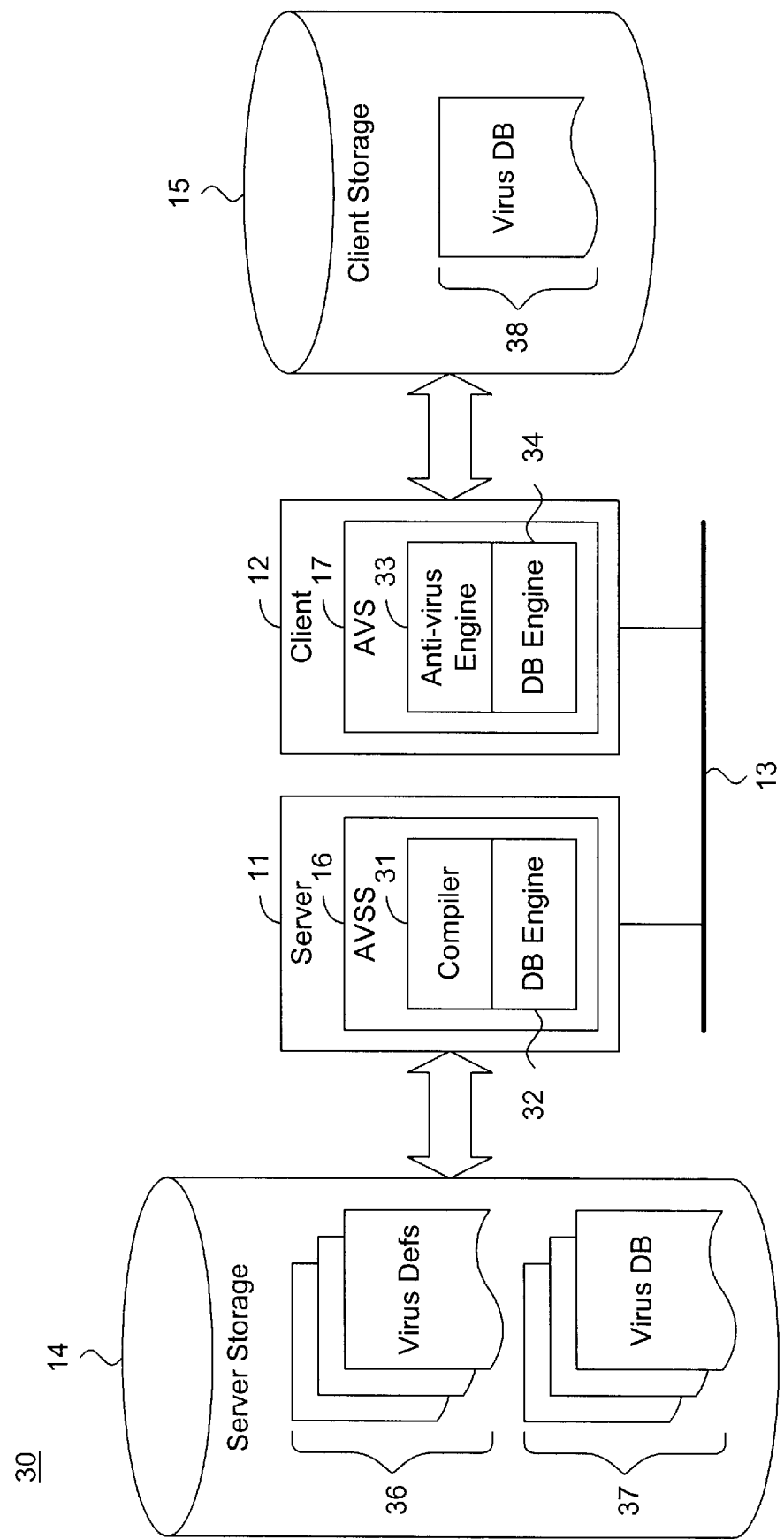
FIG. 2 is a block diagram showing a system for efficiently managing computer virus definitions using a structured virus database.

FIG. 2 is a block diagram showing a system 30 for efficiently managing computer virus definitions using a structured virus database. The system 30 includes the server 11 and client 12 with persistent storage devices. The client 12 executes an anti-virus system 17 and periodically interfaces to the anti-virus support system 16 executing on the server 11 over the internetwork 13, or other such form of interconnection, to receive anti-virus updates. The anti-virus system 17 scans and cleans the client 12 using virus definition records stored in a structured virus database 38. A related approach to distributing portable virus definition records for backward compatible use in an anti-virus system is described in commonly assigned U.S. patent application Ser. No. 09/740,617, entitled "System And Method For Distributing Portable Computer Virus Definition Records With Binary File Conversion," filed Dec. 18, 2000 pending, the disclosure of which is incorporated by reference.

The anti-virus system 17 consists of two functional modules: an anti-virus engine 33 and a database engine 34. The anti-virus support system 16 consists of two functional modules: a compiler 31 and a database engine 32. Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The anti-virus support system 16 and the anti-virus system 17 operate in accordance with a sequence of process steps, as further described below with reference to FIGS. 8 and 9, respectively.

The anti-virus system 17 actively updates a structured virus database 38 through the database engine 34. The structured virus database 38 is preferably organized as a relational database, as further described below with reference to FIG. 5. Each new set of computer viruses results in the generation of a logically updated structured master virus database 38. To minimize download time and the amount of information transferred over the internetwork 13, only the updated virus definition records are sent to the client 12. The database engine 34 modifies the local structured virus database 38 by adding, removing or replacing existing virus definition records. The anti-virus engine 33 access the virus definition records in the structured virus database 38 and interprets object code stored therein to logically define a virus scanner and cleaner.

The anti-virus support system 16 provides virus definition updates through the database engine 32. The updated virus definition records are selected from the logical sets of structured master virus databases 38. The structured master virus databases 38 are also preferably organized as relational databases, as further described below with reference to FIG. 5. The client 12 preferably pulls the updated virus definition records from the server 11 on a periodic basis in accordance with a security policy. However, the server 11 could also push the updated virus definition records or employ some form of active polling to subscribing clients.

The structured master virus databases 38 are generated by the compiler 31 and database engine 32 from raw virus definitions 36. Each virus definition includes source code written in an anti-virus language for defining virus scanning and cleaning, including removal and disablement, instructions. The compiler 31 converts each set of source code instructions into object code sentences for execution by the anti-virus engine 33. Preferably, one object code sentence for virus detection and a second object code sentence for virus cleaning are generated. The database engine 32 then builds the virus definition records of the structured master virus databases 38 and populates each virus definition record with the object code sentences.

Figure 3:
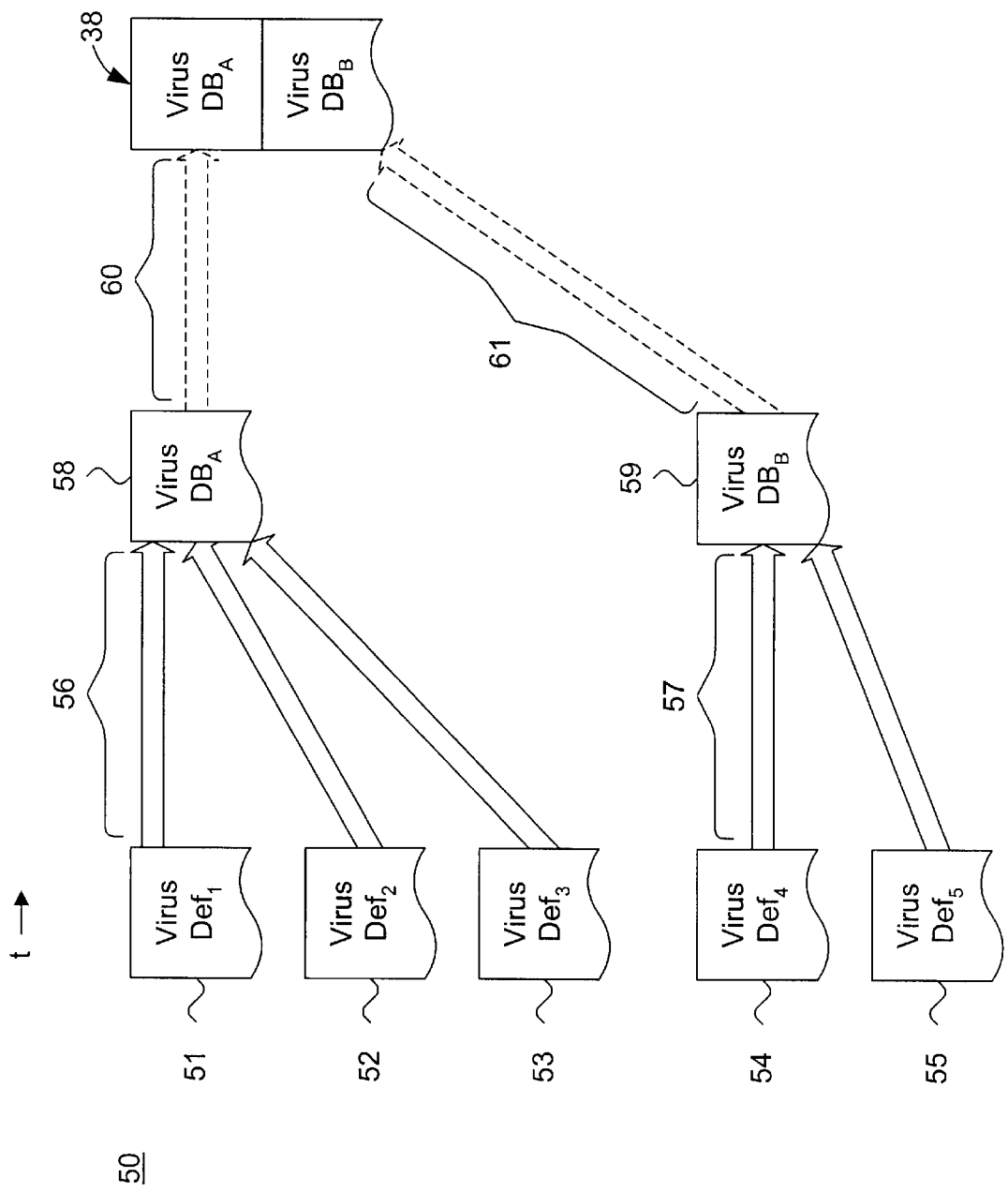
FIG. 3 is a process diagram showing, by way of example, the updating of a structured virus database from virus definition sets.

FIG. 3 is a process diagram 50 showing, by way of example, the updating of a structured virus database 38 from virus definition sets 51–55. Two sets of virus definitions represent subsequent virus updates which are maintained by the server 11 (shown in FIG. 1). The first group, consisting of virus definitions 51–53, is compiled (step 56) by compiler 31 and built into virus definition records stored in structured master virus database 'A' 58. The client 12 (also shown in FIG. 1) downloads (step 60) the structured master virus database 'A' 58 which then becomes the virus database 40 used by the anti-virus engine 33.

Similarly, the second group, consisting of virus definitions 54–55, is compiled (step 57) by compiler 31 and built into virus definition records stored in structured master virus database 'B' 59. Upon a periodic update cycle, the client 12 downloads (step 61) the updated structured master virus database 'B' 59 which is then integrated into the virus database 40 by the database engine 34.

In the described example, the structured master virus database 'A' 58 and structured master virus database 'B' 59 are separate database file. However, in practice, these two databases would preferably be maintained as a single database file and each updated virus database would be logically defined by selecting out new, changed, or deleted virus definition records.

Figure 4:
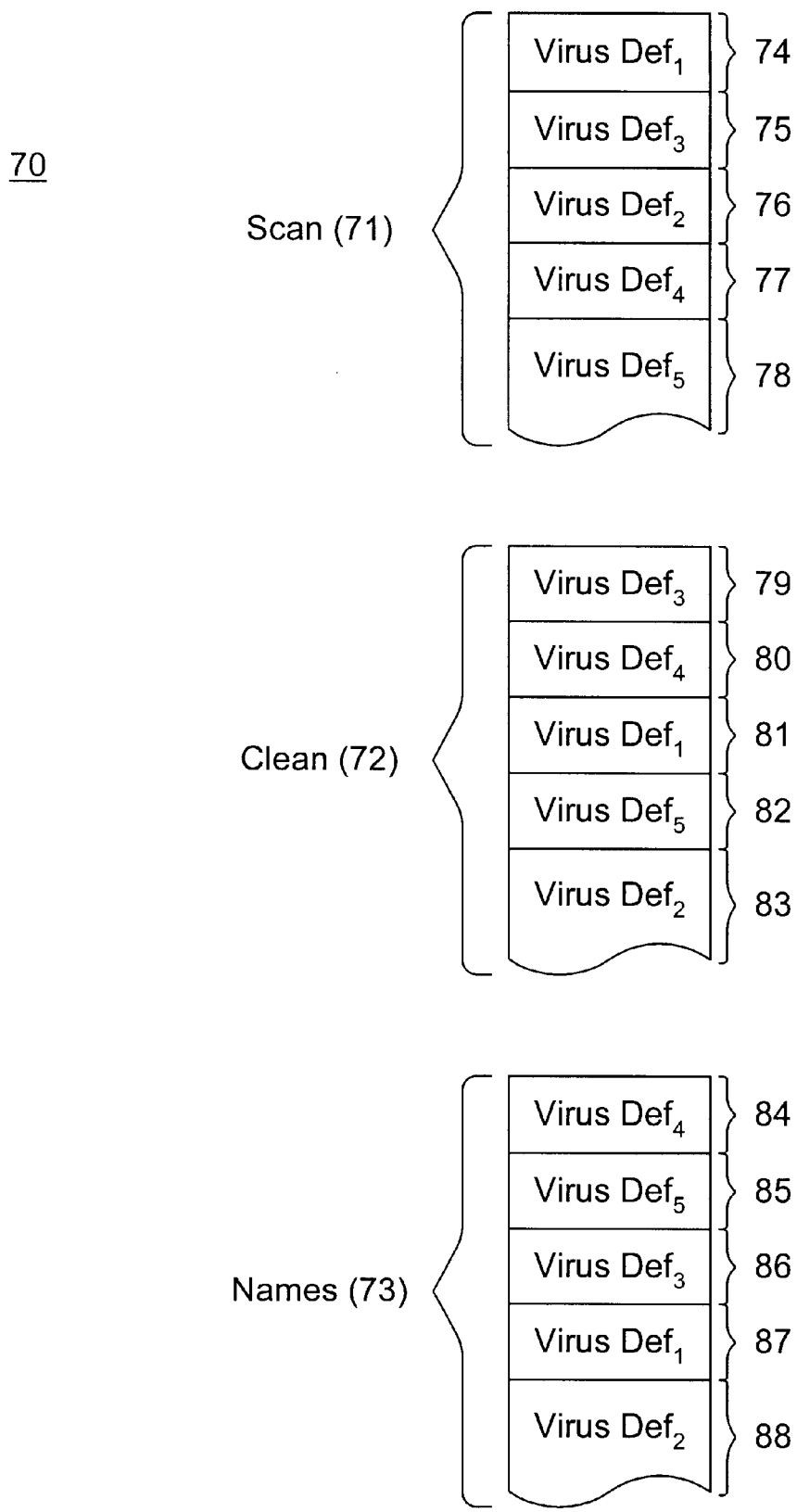
FIG. 4 is a block diagram showing the format of a prior art data file storing virus definition sets.

FIG. 4 is a block diagram showing the format 70 of a prior art data file storing virus definition sets 71–73. For optimization and to speed virus scanning, the data file 70 logically consists of three individual virus definition sets: scan 71, clean 72, and names 73. Alternatively, the virus definition sets could also be stored in a single data file. The scan virus definition set 71 binary data encoding instructions to detect a computer virus on a target machine. Likewise, the clean virus definition set 71 stores binary data encoding instructions to clean a computer virus from an infected machine. The encoded instructions are preferably in the form of object code generated by a compiler for compiling raw anti-virus language source code. The names virus definition set 73 stores descriptive names corresponding to each virus.

To further optimize performance, the individual virus definitions 74–88 are ordered within their respective virus definition set for optimal retrieval. Thus, the scan virus definition set 71 stores the virus definitions 74–78 in order of first, third, second, fourth, and fifth viruses. Similarly, the clean virus definition set 72 stores virus definitions 79–83 in order of third, fourth, first, fifth, and second viruses, while the names virus definition set 73 stores virus definitions 84–88 in order of fourth, fifth, third, first, and second viruses. Other orderings or forms of organization are feasible.

The prior art data file 70 is divided and organized to optimize virus scanning and cleaning performance. However, this format is difficult to maintain due to the arbitrary orderings of virus definitions within their respective virus definition sets and by virtue of the binary nature of the stored data. As new virus definitions can be inserted into any arbitrary location within each virus definition set, binary patch utilities often end up replacing a substantially large portion of a virus definition set.

Figure 5:
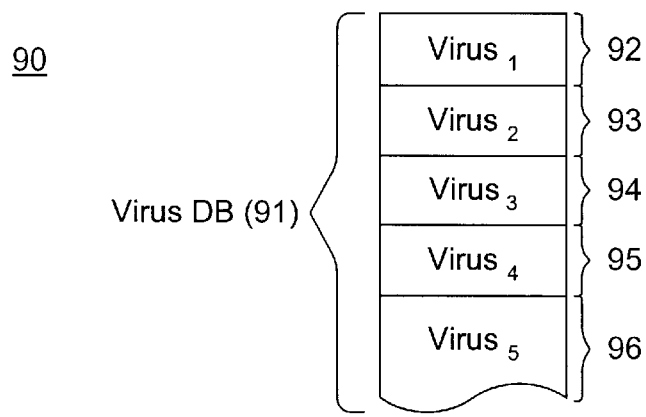
FIG. 5 is a block diagram showing the format of a structured virus database storing virus definition records for use in the system of FIG. 2.

FIG. 5 is a block diagram showing the format 90 of a structured virus database 91 storing virus definition records 92–96 for use in the system of FIG. 2. The structured virus database 91 is organized to store virus definition records 92–96 in an ordered and indexed fashion amenable to rapid access and efficient maintenance. The structured virus database 91 is preferably a relational database, such as supported by the Oracle relational database management system, version 8i, licensed by Oracle Corporation, Redwood Shores, Calif.

Figure 6:
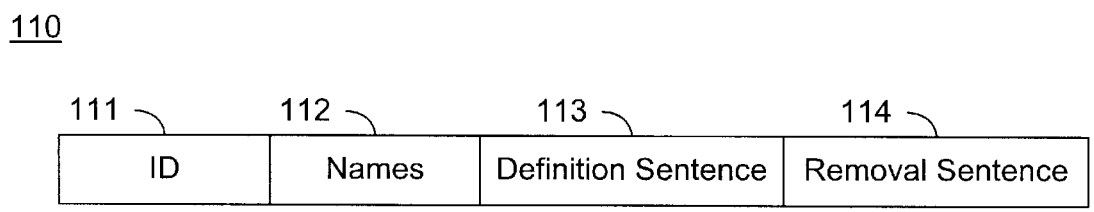
FIG. 6 is a block diagram showing the format of a virus definition record as stored in the structured virus database of FIG. 5.

FIG. 6 is a block diagram showing the format of a virus definition record 110 as stored in the structured virus database 91 of FIG. 5. Each record 110 consists of four fields: identifier (ID) 111, names 112, definition sentence 113, and removal sentence 114. The identifier field 111 uniquely identifies the computer virus described by the record 110. The names field 112 contains at least one virus name associated with the computer virus. The definition sentence 113 stores object code that provides operations to detect the computer virus within the machine being scanned. Finally, the virus removal sentence 114 stores object code providing operations to clean the identified computer virus from the scanned machine. Other database schemas and record formats could also be used.

Figure 7:
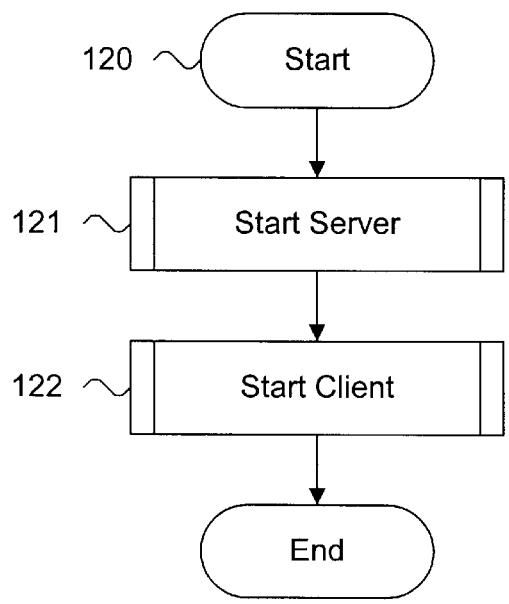
FIG. 7 is a flow diagram showing a method for efficiently managing computer virus definitions using a structured virus database in accordance with the present invention.

FIG. 7 is a flow diagram showing a method for efficiently managing computer virus definitions using a structured virus database 120 in accordance with the present invention. The method logically starts the operations performed by the server 11 (block 121) and client 12 (block 122), as further described below in FIGS. 8 and 9, respectively. In practice, the server 11 and client 12 operate independently without express synchronization or coordination. However, both systems must be operating to perform a virus database updating procedure.

Figure 8:
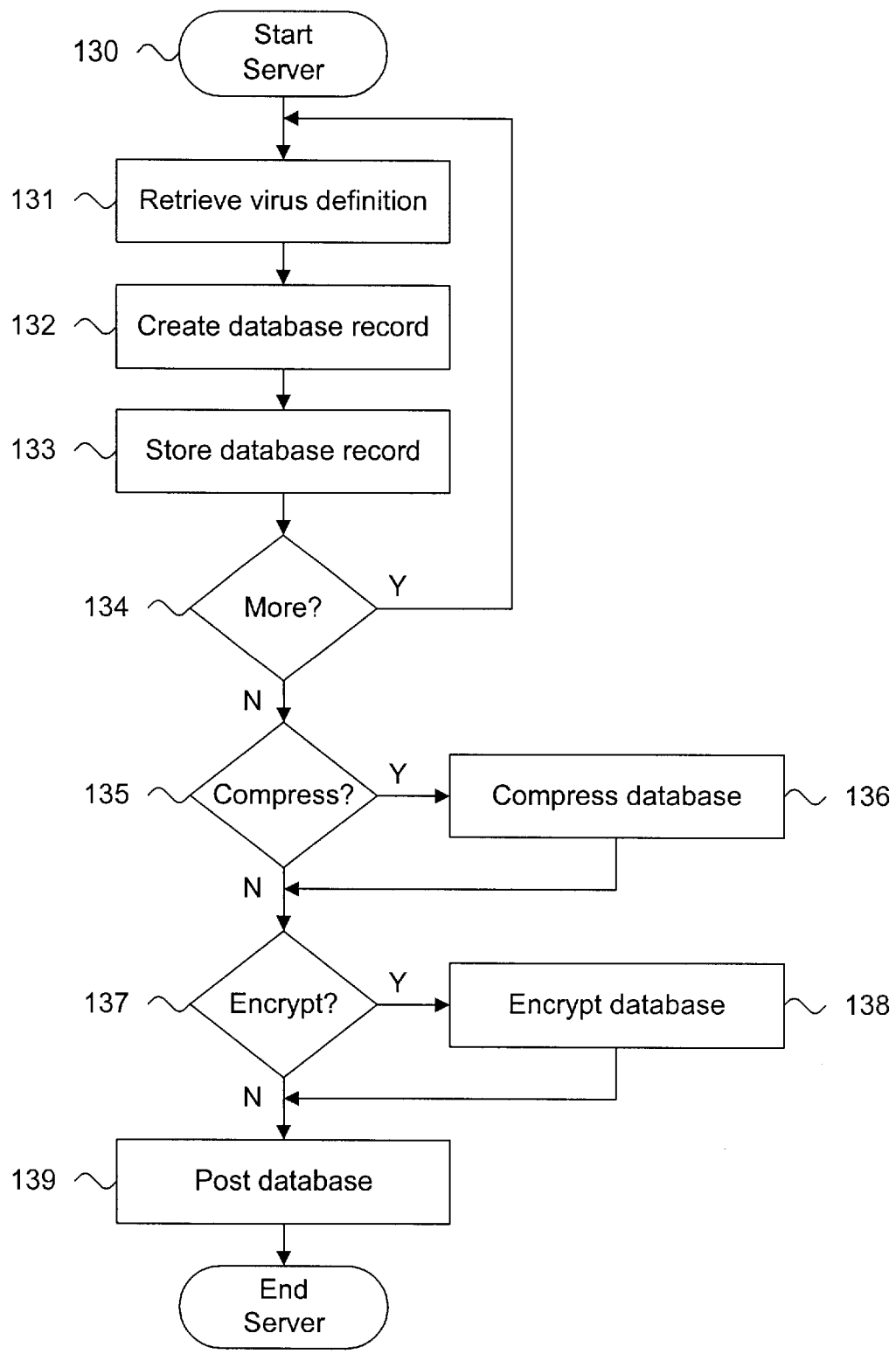
FIG. 8 is a flow diagram showing a routine for starting a server for use in the method of FIG. 7.

FIG. 8 is a flow diagram showing a routine 130 for starting a server for use in the method of FIG. 7. The purpose of this routine is to process virus definition updates for retrieval by clients. First, a virus definition 36 (shown in FIG. 2) is retrieved (block 131). A new virus definition record 110 (shown in FIG. 6) is created for (block 132) and stored into (block 133) the master structured virus database 40. The retrieval, creation, and storage operations are repeated if more virus definitions 36 are present (block 134). The logically updated structured master virus database 38, that is, the subset of the actual structured master virus database 38 only containing updated virus definition records, is posted (block 139), after which the routine ends. Note that this routine is restarted whenever necessary to update the structured master virus database 38 with new virus definitions 36.

In an alternate embodiment, the logically updated structured master virus database 38 is compressed (blocks 135–136) and, optionally, encrypted (blocks 137–138), using standard data compression and encryption procedures as are known in the art. Since the structured master virus database 38 is a structured database file, the data is stored in a physically ordered fashion, rather than in an arbitrary fashion as provided for pure binary data. Consequently, the structured master virus database 38 is better suited for compression, thereby decreasing the network bandwidth necessary to download a database update. Similarly, encryption provides heightened security.

Figure 9:
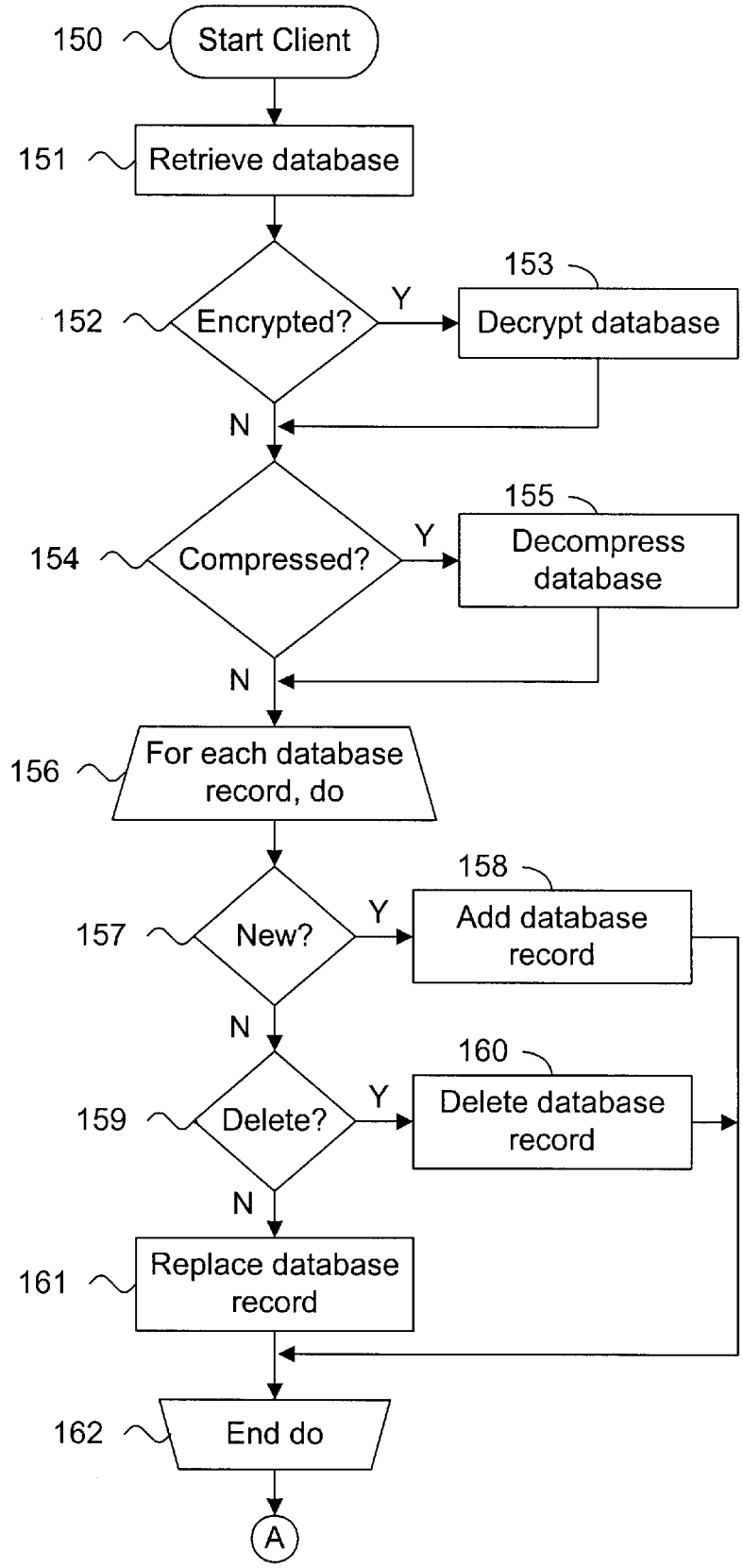
FIG. 9 is a flow diagram showing a routine for starting a client for use in the method of FIG. 7.
Figure 9:
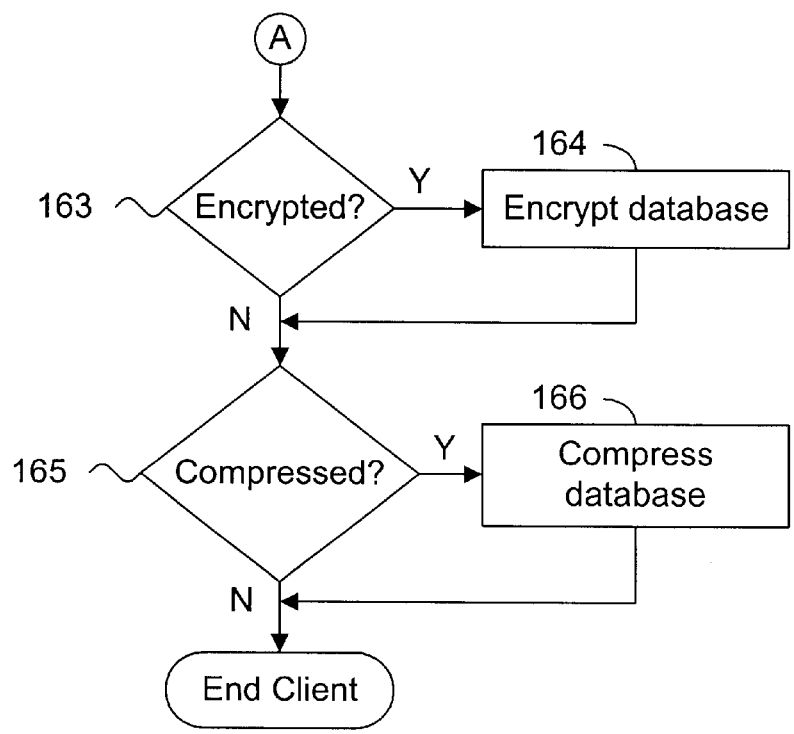

FIG. 9 is a flow diagram showing a routine 150 for starting a client for use in the method of FIG. 7. The purpose of this routine is to retrieve virus definition updates from a server and to update a structured virus database. First, a logically updated structured master virus database 38 is retrieved from the server 11 (block 151). If the structured master virus database 38 is encrypted (block 152), the file is decrypted (block 153). Similarly, if the structured master virus database 38 is compressed (block 154), the file is decompressed (block 155).

Next, each virus definition record 110 (shown in FIG. 6) in the structured master virus database 38 is iteratively processed (blocks 156–162) as follows. During each iteration (block 156), if the virus definition record 110 is new (block 157), the record is added to the structured virus database 38 (block 158). Similarly, if the virus definition record 110 was deleted (block 159), the corresponding record is deleted from the structured virus database 38 (block 160). Otherwise, if the virus definition record 110 is neither new nor deleted (blocks 157, 159), the corresponding record in the structured virus database 38 is replaced (block 161). The addition, deletion, and replacement operations (blocks 157–161) are repeated (block 162) until all records have been processed, after which the routine ends. Note that this routine is also restarted whenever necessary, and preferably on a periodic basis, to update the structured master virus database 38 with new virus definitions 36.

As with the server routine 130, in an alternate embodiment, the logically updated structured master virus database 38 is encrypted (blocks 163–164) and compressed (blocks 165–166).

While the invention has been particularly shown and described as referenced to the embodiments thereof, those skilled in the art will understand that the foregoing and other changes in form and detail may be made therein without departing from the spirit and scope of the invention.

What is claimed is:

1. A system for efficiently managing computer virus definitions using a structured virus database, comprising:
   a structured virus database storing one or more virus definition records, each virus definition record comprising:
      an identifier uniquely identifying a computer virus;
      at least one virus name associated with the computer virus;
      a virus definition sentence comprising object code providing operations to detect the identified computer virus within a computer system; and
      a virus removal sentence comprising object code providing operations to clean the identified computer virus from the computer system;
   a database engine accessing the virus definition records in the structured virus database indexed by the identifier and the at least one virus name for each virus definition record; and
   an anti-virus engine interpreting the object code of the virus definition sentence and the virus removal sentence for each accessed virus definition record.

2. A system according to claim 1, the anti-virus engine further comprising:
   a scanner detecting an infection of the computer system by the identified computer virus by executing the virus definition string for each accessed virus definition record.

3. A system according to claim 2, the anti-virus engine further comprising:
   a cleaner performing at least one of a removal and disablement of the identified computer virus upon the infection of the computer system by executing the virus removal string for each accessed virus definition record.

4. A system according to claim 1, further comprising:
   one or more virus definitions, each virus definition comprising source code written in an anti-virus language, the source code comprising:
      instructions to detect the identified computer virus within a computer system; and
      instructions for at least one of removing the identified computer virus from and disabling the identified computer virus on the computer system; and
   an anti-virus language compiler converting the virus definitions into the object code comprised in the virus definition sentence and the virus removal sentence.

5. A system according to claim 1, further comprising:
   a server database engine building the virus definition records into the structured virus database by generating the identifier for each virus definition record and populating each virus definition record with the virus definition sentence and the virus removal sentence for the identified computer virus.

6. A system according to claim 1, further comprising:
   the database engine accessing the virus definition records in the structured virus database to perform at least one of adding, removing, and replacing a virus definition record.

7. A system according to claim 1, further comprising:
   a compression module compressing the structured virus database prior to transfer; and
   a decompression module decompressing the structured virus database subsequent to transfer.

8. A system according to claim 1, further comprising:
   an encryption module encrypting the structured virus database prior to transfer; and
   a decryption module decrypting the structured virus database subsequent to transfer.

9. A system according to claim 1, wherein the structured virus database is a relational database.

10. A method for efficiently managing computer virus definitions using a structured virus database, comprising:
    storing one or more virus definition records in a structured virus database, each virus definition record comprising:
       an identifier uniquely identifying a computer virus;
       at least one virus name associated with the computer virus;
       a virus definition sentence comprising object code providing operations to detect the identified computer virus within a computer system; and
       a virus removal sentence comprising object code providing operations to clean the identified computer virus from the computer system;
    accessing the virus definition records in the structured virus database indexed by the identifier and the at least one virus name for each virus definition record; and
    interpreting the object code of the virus definition sentence and the virus removal sentence for each accessed virus definition record.

11. A method according to claim 10, further comprising:
    detecting an infection of the computer system by the identified computer virus by executing the virus definition string for each accessed virus definition record.

12. A method according to claim 11, further comprising:
performing at least one of a removal and disablement of the identified computer virus upon the infection of the computer system by executing the virus removal string for each accessed virus definition record.

13. A method according to claim 10, further comprising:
maintaining one or more virus definitions, each virus definition comprising source code written in an anti-virus language, the source code comprising:
instructions to detect the identified computer virus within a computer system; and
instructions for at least one of removing the identified computer virus from and disabling the identified computer virus on the computer system; and
converting the virus definitions into the object code comprised in the virus definition sentence and the virus removal sentence.

14. A method according to claim 10, further comprising:
building the virus definition records in the structured virus database by generating the identifier for each virus definition record and populating each virus definition record with the virus definition sentence and the virus removal sentence for the identified computer virus.

15. A method according to claim 10, further comprising:
accessing the virus definition records in the structured virus database to perform at least one of adding, removing, and replacing a virus definition record.

16. A method according to claim 10, further comprising:
compressing the structured virus database prior to transfer; and
decompressing the structured virus database subsequent to transfer.

17. A method according to claim 10, further comprising:
encrypting the structured virus database prior to transfer; and
decrypting the structured virus database subsequent to transfer.

18. A method according to claim 10, wherein the structured virus database is a relational database.

19. A computer-readable storage medium holding code for efficiently managing computer virus definitions using a structured virus database, comprising:
storing one or more virus definition records in a structured virus database, each virus definition record comprising:
an identifier uniquely identifying a computer virus;
at least one virus name associated with the computer virus;
a virus definition sentence comprising object code providing operations to detect the identified computer virus within a computer system; and
a virus removal sentence comprising object code providing operations to clean the identified computer virus from the computer system;
accessing the virus definition records in the structured virus database indexed by the identifier and the at least one virus name for each virus definition record; and
interpreting the object code of the virus definition sentence and the virus removal sentence for each accessed virus definition record.

20. A method for addressing computer virus infections with a structured virus database, comprising:
means for storing one or more virus definition records in a structured virus database, each virus definition record comprising an identifier, at least one virus name, a virus definition sentence defining operations to detect the computer virus, and a virus removal sentence defining operations to clean off the computer virus;
means for adding, removing, and replacing the virus definition records in the structured virus database; and
means for interpreting the operations of the virus definition sentence and the virus removal sentence for each accessed virus definition record.

* * * * *